(12) United States Patent
Ziller

(10) Patent No.: US 7,986,802 B2
(45) Date of Patent: Jul. 26, 2011

(54) PORTABLE ELECTRONIC DEVICE AND PERSONAL HANDS-FREE ACCESSORY WITH AUDIO DISABLE

(75) Inventor: Carl R. Ziller, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1309 days.

(21) Appl. No.: 11/552,657

(22) Filed: Oct. 25, 2006

(65) Prior Publication Data

US 2008/0101638 A1    May 1, 2008

(51) Int. Cl.
   *H04R 1/02*   (2006.01)
   *H04R 9/06*   (2006.01)
   *H04R 1/10*   (2006.01)
   *H03G 3/20*   (2006.01)
   *H04M 1/00*   (2006.01)
   *H04M 9/00*   (2006.01)

(52) U.S. Cl. ........ 381/334; 381/74; 381/57; 379/392.01

(58) Field of Classification Search .................. 381/334, 381/74, 57; 379/392.01; 455/556.1, 575.2, 455/567
   See application file for complete search history.

(56) References Cited

U.S. PATENT DOCUMENTS

| | | | |
|---|---|---|---|
| 2001/0046304 A1* | 11/2001 | Rast | ................................ 381/74 |
| 2003/0118197 A1 | 6/2003 | Nagayasu et al. | |

FOREIGN PATENT DOCUMENTS

| | | |
|---|---|---|
| EP | 0 495 653 | 7/1992 |
| EP | 1 191 770 A2 | 3/2002 |

OTHER PUBLICATIONS

International Preliminary Report on Patentability for corresponding Application No. PCT/US2007/067732 mailed Nov. 26, 2008.
International Search Report for corresponding Application No. PCT/US2007/067732 mailed Feb. 12, 2008.

* cited by examiner

*Primary Examiner* — Vivian Chin
*Assistant Examiner* — Douglas J Suthers
(74) *Attorney, Agent, or Firm* — Renner, Otto, Boisselle & Sklar, LLP

(57) ABSTRACT

A portable electronic device and personal hands-free accessory are provided. The personal hands free accessory includes at least one electro-acoustic speaker, and at least one microphone that receives ambient sound and converts the ambient sound to an ambient sound signal. Included among the portable electronic device and the personal hands-free accessory are a processing circuit, the processing circuit including circuitry that combines an audio signal from the portable electronic device with the ambient sound signal from the at least one microphone to produce a combined audio signal provided to the at least one speaker such that the at least one speaker reproduces the ambient sound in combination with audio from the audio signal; event detecting circuitry for detecting an occurrence of a predefined event; and disabling circuitry for substantially disabling the reproduction of the ambient sound signal by the at least one speaker based upon the detected occurrence of the predefined event, while still permitting the reproduction of the audio signal.

16 Claims, 7 Drawing Sheets

PORTABLE ELECTRONIC DEVICE AND PERSONAL HANDS-FREE ACCESSORY WITH AUDIO DISABLE

TECHNICAL FIELD OF THE INVENTION

The present invention relates generally to portable electronic devices, and more particularly to personal hands-free accessories for use with portable electronic devices.

DESCRIPTION OF THE RELATED ART

Portable electronic devices have been popular for decades and continue to increase in popularity. Many modern portable electronic devices are intended or suitable for recording or playback of acoustic and/or video signals. For example, portable CD or DVD players, MPEG players, MP-3 players, etc., provide a vast variety of forms of personal entertainment. Whether audio and/or video entertainment, there are numerous portable electronic devices to satisfy any user's tastes.

Similarly, portable electronic devices in the form of mobile phones, pagers, communicators, e.g., electronic organizers, personal digital assistants (PDAs), smartphones or the like continue to increase in popularity. Such devices allow a user to communicate with others, store and manipulate data, create text, etc., many times within the same device.

Depending on the particular application(s), oftentimes a personal hands-free (PHF) accessory such as a headset or earpiece is used in combination with the portable electronic device. The PHF accessory typically includes one or more loudspeakers formed in respective earpiece housings that are either placed within the ear (in-ear headphones) or over the ear (over-the-ear headphones). A PHF accessory allows the user of a mobile phone to engage in hands free discussion, for example. In the case of media players, a PHF accessory allows a user to enjoy a private listening experience without bothering others.

Conventional PHF accessories, however, do possess disadvantages. The earpieces alone or in combination with the music or other audio reproduced by the headset can completely block out all other sounds from the environment. Typically, the higher the volume of the audio being reproduced, the less likely that outside environmental sounds will be recognized by the user. While there are times the user may desire isolation of this type, there also are times when the user's inability to hear these ambient sounds can be undesirable or even dangerous. For example, a user wearing a PHF accessory while in traffic may be unable to hear police or emergency equipment sirens, thereby creating a potentially dangerous situation. In a social situation, a user wearing a PHF accessory still may desire to hear ambient sound from his/her surroundings.

Furthermore, in the case where the portable electronic device is a mobile phone or the like with a PHF accessory, the absence of ambient sound while the user is speaking can result in the user's own speech sounding unnatural. This can lead to user discomfort.

PHF accessories in the past have attempted to maintain the provision of ambient sound in addition to the conventional audio to be reproduced by the accessories. Such accessories have included headsets and earpieces with one or more microphones designed to pick up ambient sounds. Alternatively, the microphone typically used for picking up speech also serves to pick up ambient sounds. The ambient sounds are then combined with the audio signal and reproduced by the accessory.

Nevertheless, the aforementioned attempts at providing a user with comfortable and convenient reproduction of ambient sound together with the desired audio have resulted in some drawbacks. For example, the PHF accessory is required at times to reproduce an audio signal from the portable electronic device that is relatively low in amplitude. As a particular example, the portable electronic device may be a mobile phone. During certain events, such as when listening to an automated system, e.g., a voicemail, automated attendant, on-hold audio system, etc., the level of the audio signal provided by the portable electronic device to the PHF accessory may be low. This can make it difficult for the user to hear the audio signal reproduced by the PHF accessory.

Further exacerbating this problem is the provision of ambient sound by the PHF accessory. For example, wind noise, surrounding environmental noise (e.g., conversations, radio, music, traffic, etc.), the user's own breathing, and other types of ambient sound, when combined with the low level audio signal, may tend to mask the audio signal. This can make it more difficult or even impossible for the user to discern the reproduced audio signal.

In order to avoid such drawbacks, a user may choose to utilize a PHF accessory that does not include ambient sound reproduction or turn off the ambient sound reproduction completely. In such case, however, the user also loses the above-mentioned conveniences and natural feel associated with the PHF accessory also reproducing ambient sound.

In view of the aforementioned shortcomings associated with existing PHF accessories, there is a strong need in the art for a portable electronic device and PHF accessory that avoids the difficulties associated with reproduced ambient sound masking the desired audio signal. At the same time, there is a strong need in the art for such a portable electronic device and PHF accessory that still provides the advantages associated with reproducing ambient sound in addition to the desired audio signal.

SUMMARY

According to an aspect of the invention, a personal hands-free accessory is provided for use with a portable electronic device. The accessory includes an input that receives an audio signal from the portable electronic device, and at least one electro-acoustic speaker for converting electrical signals to audible sound. In addition, the accessory includes at least one microphone that receives ambient sound and converts the ambient sound to an ambient sound signal. The accessory further includes a processing circuit, the processing circuit including circuitry that combines the audio signal from the portable electronic device with the ambient sound signal from the at least one microphone and provides the combined signals to the at least one speaker such that the at least one speaker reproduces the ambient sound in combination with audio from the audio signal. In addition, the accessory includes event detecting circuitry for detecting an occurrence of a predefined event, and disabling circuitry for substantially disabling the reproduction of the ambient sound signal by the at least one speaker based upon the detected occurrence of the predefined event, while still permitting the reproduction of the audio signal.

According to another aspect of the invention, the portable electronic device includes a mobile phone, and the predefined event includes the mobile phone engaging in a phone communication with a predefined connection.

In accordance with another aspect, the predefined connection includes a voicemail connection.

According to still another aspect, the predefined event includes the audio signal being below a predefined threshold amplitude.

According to yet another aspect, the disabling circuitry includes a switch for switching the ambient sound signal.

In accordance with still another aspect, the disabling circuitry includes an adjustable gain amplifier that adjusts the gain of the ambient sound signal.

In accordance with yet another aspect, the personal hands free accessory includes an input that receives a combined audio signal from the portable electronic device, at least one electro-acoustic speaker for converting the combined audio signal to audible sound, and at least one microphone that receives ambient sound and converts the ambient sound to an ambient sound signal that is output to the portable electronic device. The portable electronic device includes a processing circuit, the processing circuit including circuitry that combines an audio signal from the portable electronic device with the ambient sound signal from the at least one microphone to produce the combined audio signal provided to the at least one speaker such that the at least one speaker reproduces the ambient sound in combination with audio from the audio signal. The portable electronic device further includes event detecting circuitry for detecting an occurrence of a predefined event, and disabling circuitry for substantially disabling the reproduction of the ambient sound signal by the at least one speaker based upon the detected occurrence of the predefined event, while still permitting the reproduction of the audio signal.

According to another aspect, the portable electronic device includes a mobile phone, and the predefined event includes the mobile phone engaging in a phone communication with a predefined connection.

In accordance with another aspect, the predefined connection includes a voicemail connection.

In accordance with still another aspect, the predefined event includes the audio signal being below a predefined threshold amplitude.

According to another aspect, the disabling circuitry includes a switch for switching the ambient sound signal.

With yet another aspect, the disabling circuitry includes an adjustable gain amplifier that adjusts the gain of the ambient sound signal.

According to another aspect of the invention, a portable electronic device and personal hands-free accessory are provided. The personal hands free accessory includes at least one electro-acoustic speaker, and at least one microphone that receives ambient sound and converts the ambient sound to an ambient sound signal. Included among the portable electronic device and the personal hands-free accessory are a processing circuit, the processing circuit including circuitry that combines an audio signal from the portable electronic device with the ambient sound signal from the at least one microphone to produce a combined audio signal provided to the at least one speaker such that the at least one speaker reproduces the ambient sound in combination with audio from the audio signal; event detecting circuitry for detecting an occurrence of a predefined event; and disabling circuitry for substantially disabling the reproduction of the ambient sound signal by the at least one speaker based upon the detected occurrence of the predefined event, while still permitting the reproduction of the audio signal.

With yet another aspect, the electronic device includes the processing circuitry, the event detecting circuitry, and the disabling circuitry.

In still another aspect, the electronic device includes the processing circuitry and the event detecting circuitry, and the personal hands-free accessory includes the disabling circuitry.

According to another aspect, the electronic device includes the processing circuitry, and the personal hands-free accessory includes the event detecting circuitry and the disabling circuitry.

With yet another aspect, the personal hands-free accessory includes the processing circuitry, the event detecting circuitry, and the disabling circuitry.

According to another aspect, the portable electronic device comprises a mobile phone, and the predefined event comprises the mobile phone engaging in a phone communication with a predefined connection.

According to still another aspect, the predefined connection includes a voicemail connection.

In accordance with another aspect, the predefined event includes the audio signal being below a predefined threshold amplitude.

With still another aspect, the disabling circuitry comprises a switch for switching the ambient sound signal.

According to another aspect, the disabling circuitry comprises an adjustable gain amplifier that adjusts the gain of the ambient sound signal.

In accordance with another aspect, the predefined event includes receipt of a user input.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
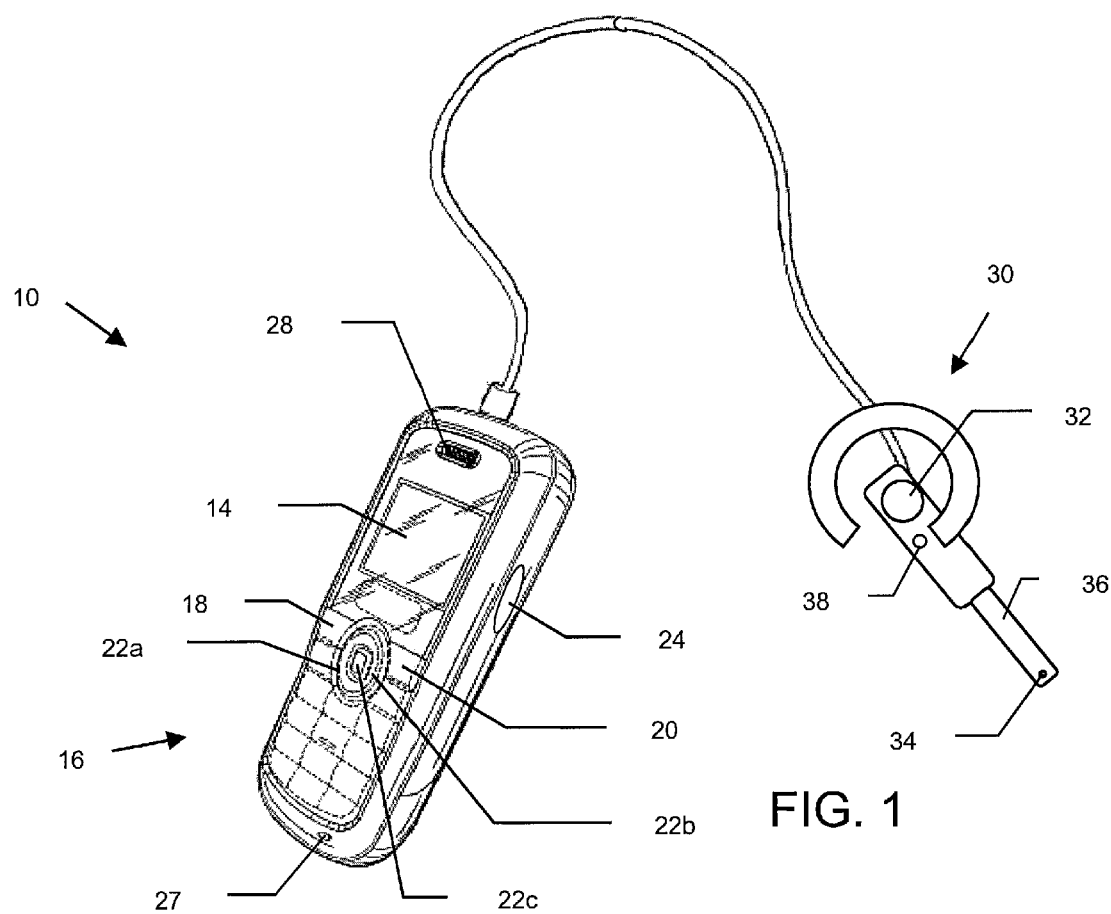
FIG. 1 illustrates a mobile phone and personal hands-free (PHF) earpiece in accordance with an exemplary embodiment of the present invention.

The present invention will now be described with reference to the drawings, wherein like reference numerals are used to refer to like elements throughout.

Referring initially to FIG. 1, a portable electronic device 10 is shown in accordance with the present invention. In the exemplary embodiment described herein, the portable electronic device is a mobile phone 10. The mobile phone 10 is shown as having a "brick" or "block" design type housing, but it will be appreciated that other type housings such as clamshell or slide-type housings may be utilized without departing from the scope of the invention.

In the following description, the portable electronic device 10 is described primarily in the context of a mobile phone 10. It will be appreciated, however, that the device 10 may be any type of portable electronic device (e.g., a personal digital assistant (PDA), personal media player, etc.). The particular type of portable electronic device is not germane to the present invention in its broadest sense.

The mobile phone 10 includes a display 14 and keypad 16. As is conventional, the display 14 displays information to a user such as operating state, time, phone numbers, contact information, and various navigational menus, etc., which enable the user to utilize the various features of the mobile phone 10. Similarly, the keypad 16 may be conventional in that it provides for a variety of user input operations. For example, the keypad 16 typically includes alphanumeric keys for allowing entry of alphanumeric information such as telephone numbers, phone lists, contact information, notes, etc. In addition, the keypad 16 typically includes special function keys such as a "call send" key 18 for initiating or answering a call, and a "call end" key 20 for ending, or "hanging up" a call. Special function keys may also include menu navigation keys 22a, 22b and 22c, for example, for navigating through a menu displayed on the display 14 to select different phone functions, profiles, settings, etc., as is conventional. Other keys included in the keypad 16 may include a volume key 24, on/off power key (not shown), as well as various other keys such as a web browser launch key, camera key, etc.

In the particular embodiment of FIG. 1, the mobile phone 10 includes the display 14 and separate keypad 16. In an alternative embodiment, the display 14 may comprise a touchscreen which itself includes one or more keys. In yet another embodiment, the display 14 may comprise a touchscreen that includes all or substantially all of the keys used to operate the phone 10 so as to include a very limited keypad 16 or no keypad 16 at all. As will be appreciated, the particular form and function of the keys included in the keypad 16 or touchscreen/display 14 are not germane to the invention in its broadest sense.

The mobile phone 10 may be a multi-functional device that is capable of carrying out various functions in addition to traditional mobile phone functions. For example, the mobile phone 10 in accordance with the present invention may also function as a media player. More specifically, the mobile phone 10 may be capable of playing different types of media objects such as audio files (e.g., MP3, .wma, AC-3), video files (e.g., MPEG, .wmv, etc.), still images (e.g., .pdf, JPEG, .bmp, etc.). The media objects are typically stored in non-volatile memory within the mobile phone 10.

The mobile phone 10 includes a microphone 27 for receiving audio and a speaker 28 for reproducing audio as is conventional. In addition, the user may choose to use the mobile phone 10 with a personal hands free (PHF) accessory such as a PHF headset 30. The headset 30 may be a wired headset that is plugged into or otherwise connected to an audio port of the mobile phone 10 via an appropriate connector as represented in FIG. 1. Alternatively, the headset 30 may be a wireless type headset. For example, the mobile phone 10 and headset 30 may both be Bluetooth compatible so as to provide for wireless operation. The particular format by which the mobile phone 10 and headset 30 communicate wirelessly can be any format (e.g., radio frequency (RF), optical, infrared, etc.) without departing from the scope of the invention.

In the exemplary embodiment, the headset 30 includes a speaker 32 that is positioned in or near the ear of the user when worn by the user. In addition, the headset 30 includes a microphone 34, in this case attached at the end of a boom 36, that is located proximate the mouth of the user. The speaker 32 serves to reproduce audio from a party at the other end of the telephone call and provided by the mobile phone 10 during a telephone conversation, for example. The microphone 34, on the other hand, produces an audio signal indicative of the spoken content of the user. The audio signal is provided to the mobile phone 10, and in turn is transmitted to the party at the other end of the call.

The headset 30 further includes an ambient sound microphone 38 for picking up ambient sounds as discussed above in associated with the conventional art. As will be described in more detail below, the ambient sound microphone 38 picks up ambient sounds (including the user's own voice, for example) and produces an ambient sound signal that is reproduced through the speaker 32 in addition to the conventional audio signal from the mobile phone 10. In accordance with another embodiment of the invention, the ambient sound microphone 38 is omitted. Instead, the microphone 34 itself serves to pick up ambient sounds (including the user's own voice, for example) in order to produce an ambient sound signal that is reproduced through the speaker 32, again in addition to the conventional audio signal from the mobile phone 10.

The headset 30 as discussed herein is of a monoaural type, meaning the headset 30 includes a speaker for only one ear. It will be appreciated, however, that the headset 30 may instead be of a stereophonic type in the sense that a speaker is provided for each ear of the user. The present invention is not limited to any particular type of headset in this regard.

For reasons that will be explained more fully below, the mobile phone 10 and PHF headset 30 overcome the aforementioned shortcomings associated with conventional portable electronic devices and PHF accessories. In other words, the mobile phone 10 and PHF headset 30 avoid the difficulties associated with reproduced ambient sound masking the desired audio signal. Generally speaking, the mobile phone 10 and/or PHF headset 30 include a processing circuit having circuitry that combines the audio signal from the mobile phone 10 with the ambient sound signal provided by the microphone 34 and/or 38. The processing circuitry provides the combined audio signals to the speaker 32 such that the speaker 32 reproduces the ambient sound in combination with audio from the audio signal.

More specifically, the mobile phone 10 and/or PHF headset 30 include an event detecting circuit for detecting an occurrence of a predefined event. In the exemplary embodiment, the predefined event may be a situation where the audio signal provided by the mobile phone 10 drops below a predefined threshold level or amplitude. Alternatively, the predefined event may be a situation where the mobile phone 10 engages in a phone communication with a predefined connection such as a connection to the user's voicemail, an automated attendant, etc. As yet another alternative, the predefined event may be the receipt of a user input (e.g., via the keypad 16). The mobile phone 10 and PHF headset 30 further include a disabling circuit that substantially disables the reproduction of the ambient sound signal by the speaker 32 based upon the detected occurrence of the predefined event, while still permitting the reproduction of the audio signal. By substantially disabling the reproduction of the ambient sound during such event, the user is better able to discern or understand the audio signal provided by the mobile phone 10 without the audio signal otherwise being masked by the ambient sound signal.

As will be described in more detail below, the disabling circuit may substantially disable the reproduction of the ambient sound by a manner which results in the ambient sound not being reproduced by the speaker 32 at all or at least being reproduced at a substantially reduced level. For example, the disabling circuit may include a switch that simply switches the ambient sound signal in or out of an adder that adds the ambient sound signal to the audio signal from the mobile phone 10. As another example, the disabling circuit may adjust the gain of an audio amplifier that amplifies the ambient sound signal so as to substantially reduce the audio level of the ambient sound signal relative to the standard audio signal. Various other techniques may be utilized as will be appreciated.

For sake of simplicity, the present invention is described herein primarily in terms of discrete components. It will be appreciated, however, that the present invention can be implemented in a variety of ways without departing from the scope of the present invention. For example, the audio processing may be carried out primarily using analog components, digital components, or any combination thereof. Similarly, the audio processing may be carried out via hardware, software, or any combination thereof.

Figure 2:
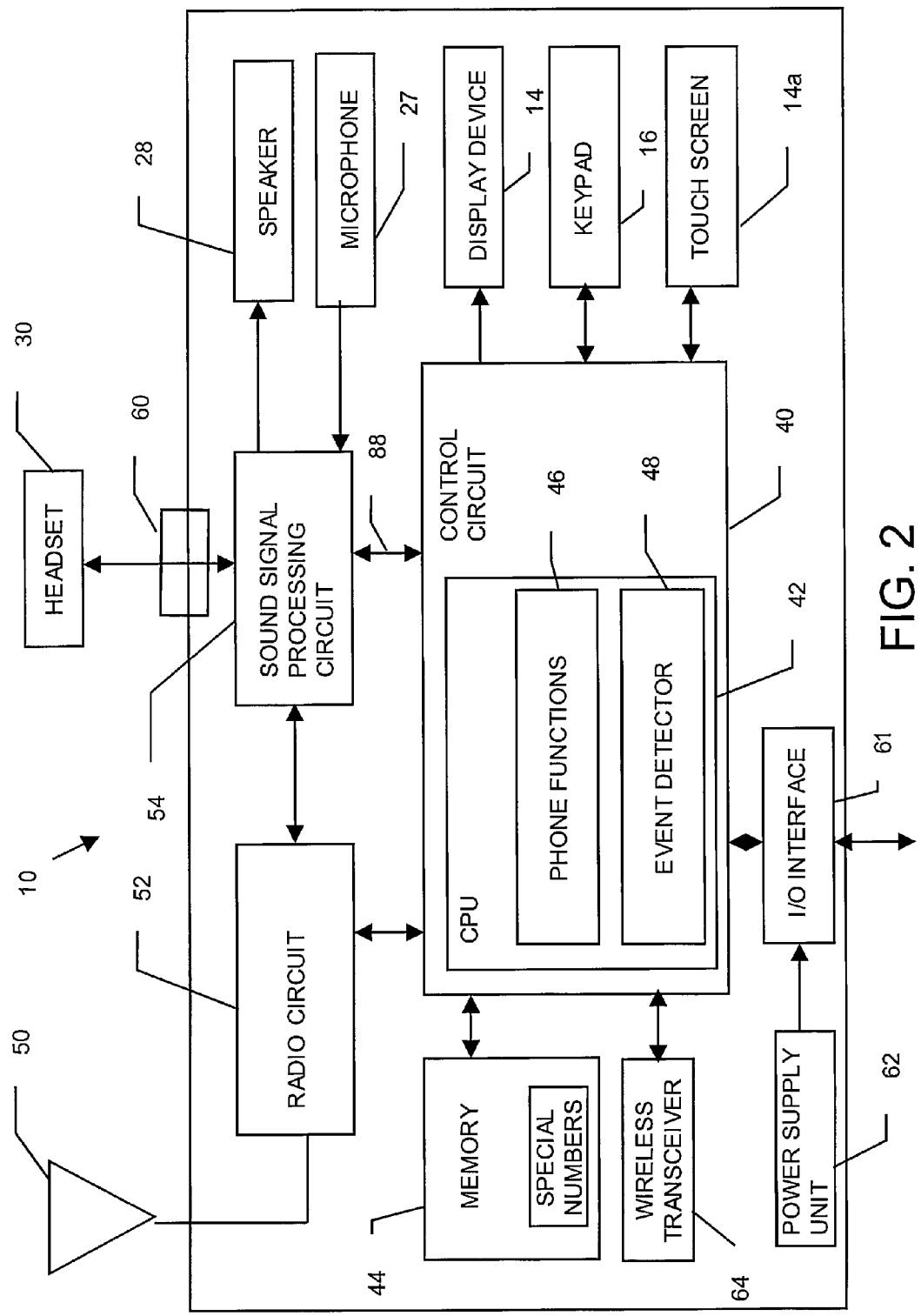
FIG. 2 is a block diagram of a mobile phone in relevant part in accordance with an exemplary embodiment of the present invention.

FIG. 2 is a functional block diagram of the mobile phone 10. The construction of the mobile phone 10 is generally conventional with the exception of the audio signal processing and reproduction as described herein. The mobile phone 10 includes a primary control circuit 40 that is configured to carry out overall control of the functions and operations of the mobile phone 10. The control circuit 40 may include a CPU, microcontroller, or microprocessor, etc., collectively referred to herein simply as a CPU 42. The CPU 42 executes code stored in memory within the control circuit 40 (not shown) and/or in a separate memory 44 in order to carry out conventional operation of the mobile phone functions 46 within the mobile phone 10. In addition, however, the CPU 42 executes code stored in the memory 44 in accordance with the present invention in order to detect predefined event(s) and associated functions in accordance with the invention as described herein.

The memory 44 may include one or more "special" numbers entered by the user or otherwise provided within the mobile phone 10. These special numbers my include the telephone number of a user's voicemail, the telephone number of an automated attendant at the user's place of business, or any other telephone number that identifies a particular connection with which the user expects to experience difficulty in hearing due to possible low sound levels, etc. The user may enter such telephone numbers in the mobile phone 10 via a menu based graphical user interface on the display 14, or the like. In addition, or in the alternative, such numbers may be stored in memory 44 by the service provider upon activation of the phone 10, for example. The control circuit 40 includes an event detector function 48 whereby the control circuit 40 is programmed to detect, as an event, whenever the mobile phone 10 places or receives a call via connection with any of the special numbers stored in the memory 44. With respect to outgoing calls, the mobile phone 10 may do this simply by identifying the number called by the user. As for incoming calls, the mobile phone 10 may recognize the number simply by virtue of the same technology that results in caller identification and the display thereof in conventional mobile phones.

In addition, or in the alternative, for example, the control circuit 40 as part of the event detector function 48 is programmed to detect an event whereby an audio signal received from a party at the other end of a call drops below a predetermined threshold amplitude. Such threshold amplitude may be preselected by the manufacturer or set by the service provider. Alternatively, the mobile phone 10 may be configured such that the user may select the threshold amplitude via a menu or the like. The threshold amplitude preferably is an amplitude which, if the audio signal drops below such amplitude, the user may experience difficulty discerning the received audio signal during reproduction due to masking by the ambient sound signal. The control circuit 40 may detect when the audio signal received from a party drops below the predetermined threshold by way of a simple comparator circuit or the like, as will be appreciated. Accordingly, further detail has been omitted for sake of brevity.

As yet another alternative, the control circuit 40 as part of the event detector function 48 is programmed to detect whether a user input has been received (e.g., via the keypad 16). Such user input is a predefined input representing a request by the user that the reproduction of the ambient sound be disabled.

Continuing to refer to FIG. 2, the mobile phone 10 includes an antenna 50 coupled to a radio circuit 52. The radio circuit 52 includes a radio frequency transmitter and receiver for transmitting and receiving signals via the antenna 50 as is conventional. The mobile phone 10 further includes a sound signal processing circuit 54 for processing the audio signal transmitted by/received from the radio circuit 52 as described in more detail with respect to FIGS. 3-5. Coupled to the sound processing circuit 54 are the aforementioned microphone 27 and speaker 28. In addition, a headphone jack 60 coupled to the sound processing circuit 54 is provided. This allows the headset 30 to be connected to the mobile phone 10. Thus, when using the headset 30 the mobile phone 10 may direct audio to and from the headset 30 in lieu of the microphone 27 and speaker 28, as is conventional. The radio circuit 52 and sound processing circuit 54 are each coupled to the control circuit 40 so as to carry out overall operation as described herein.

The mobile phone 10 also includes the aforementioned display 14 and keypad 16 coupled to the control circuit 40. In the case where all or part of the display 14 comprises a touchscreen, such operation may be represented by the touchscreen 14a in FIG. 2. The mobile phone 10 further includes an I/O interface 61. The I/O interface 61 may be in the form of any one of many typical mobile phone I/O interfaces, such as a multi-element connector at the base of the mobile phone 10. As is typical, the I/O interface 61 may be used to couple the mobile phone 10 to a battery charger to charge a power supply unit 62 within the mobile phone 10. In addition, the mobile phone 10 may include a wireless transceiver 64 such as a Bluetooth transceiver or the like for enabling the mobile phone 10 to operate in conjunction with similarly equipped devices, such as a wireless headset 30 as discussed below in relation to FIGS. 7 and 8.

Figure 3:
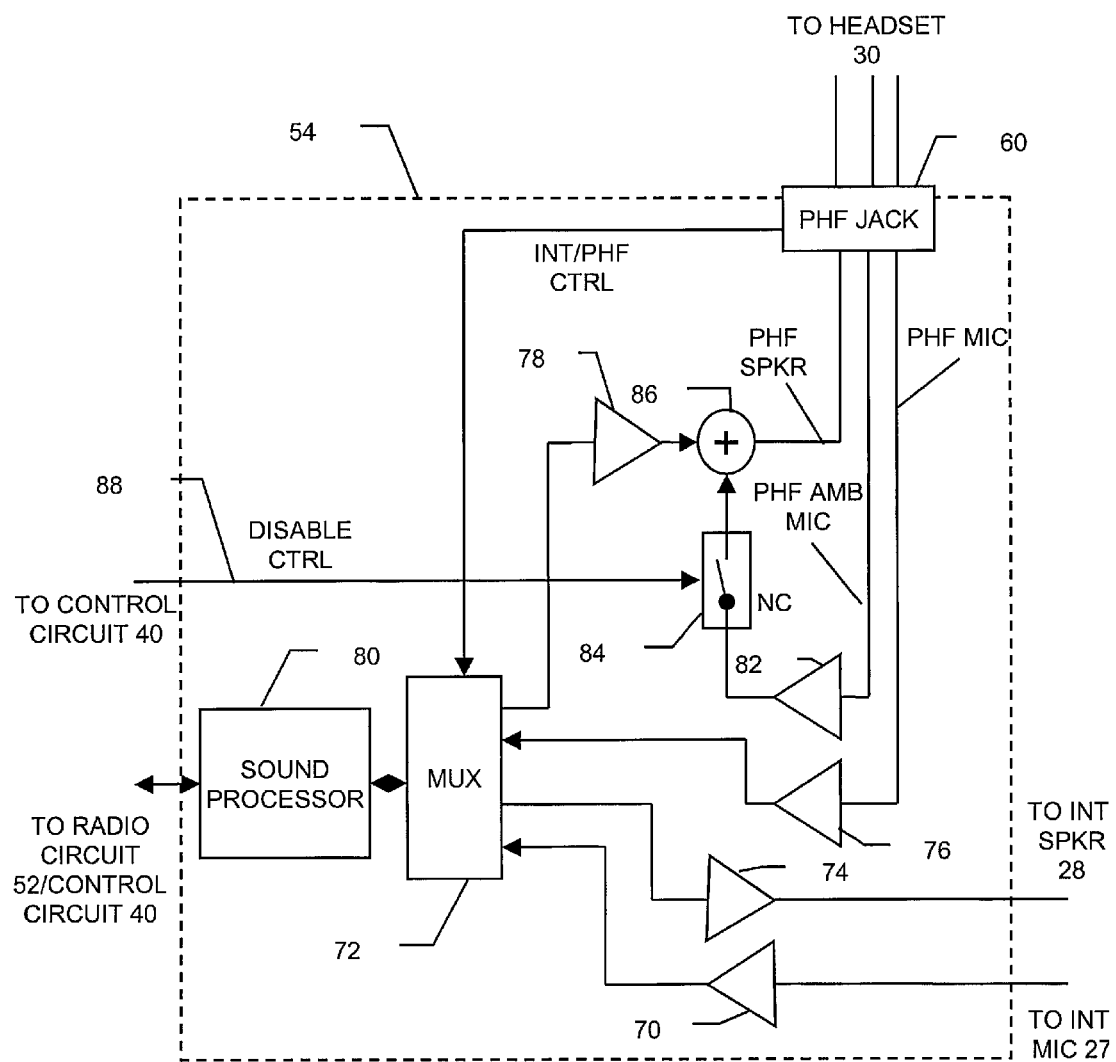
FIG. 3 is a schematic diagram of the sound signal processing circuit in the mobile phone in accordance with an exemplary embodiment of the present invention.

Turning now to FIG. 3, a first example of the sound signal processing circuit 54 is shown in accordance with the present invention. In this example, the headset 30 is a wired headset including a speaker 32 and both a standard voice microphone 34 and an ambient sound microphone 38. The headset 30 is coupled to the mobile phone 10 via the jack 60 so that signals between the mobile phone 10 and the headset 30 may be communicated via direct wire.

The sound signal processing circuit 54 receives an audio signal from the mobile phone 10 internal microphone 27, and outputs an audio signal to the internal speaker 28. The audio signal from the microphone 27 is fed via an amplifier 70 to a first channel of a multiplexer 72. The first channel of the multiplexer 72 also outputs an audio signal received by the mobile phone 10 to the internal speaker 28 via an amplifier 74.

A second channel of the multiplexer 72 receives an audio signal from the standard voice microphone 34 of the PHF headset 30 via an amplifier 76. Similarly, the second channel of the multiplexer 72 outputs the audio signal received by the mobile phone 10 to the speaker 32 of the headset 30 via an amplifier 78. A sound processor 80 is included in the sound signal processing circuit 54. The sound processor 80 processes the audio received from or sent to the radio circuit 52 and/or the control circuit 40 in accordance with conventional mobile phone communication. The sound processor 80 processes the audio in relation to either the internal microphone 27 and speaker 28, or the microphone 34 and speaker 32 of the headset 30, depending on whether the headset 30 is in use by the user. For example, if the headset 30 is coupled to the jack 60, a control signal is provided to the multiplexer 72 as represented in FIG. 3 so as to connect the sound processor to the headset 30. Conversely, if the headset 30 is not connected to the jack 60, the control signal provided to the multiplexer causes the sound processor 80 to be coupled instead to the internal microphone 27 and speaker 28.

As is shown in FIG. 3, the ambient sound signal from the ambient sound microphone 38 of the headset 30 is received by the signal processing circuit 54 via the jack 60 and is input to an amplifier 82. The output of the amplifier 82 is coupled to one terminal of a normally-closed (NC) switch 84 included in the signal processing circuit 54. The other terminal of the switch 84 is coupled to an input of an adder 86. Also input to the adder 86 is the received audio signal provided by the mobile phone 10 as output from the amplifier 78. The output of the adder 86 is connected via the jack 60 to the speaker 32 included in the PHF headset 30.

Accordingly, it will be appreciated that during normal operation the output of the adder 86 represents the combination of the audio signal provided by the mobile phone 10 and the ambient sound signal provided by the ambient sound microphone 38. The headset speaker 32 reproduces the output of the adder 86 so that the user may hear both the received audio signal and the ambient sound signal. In this manner, the user does not experience the inconvenience or discomfort associated with not having ambient sound mixed in with the audio signal received by the mobile phone 10.

In accordance with the present invention, however, if the control circuit 40 detects the occurrence of an event such as a call to or from one of the "special" numbers stored in memory 44, the received audio signal having an amplitude below a predetermined threshold as discussed above, or the receipt of a user input requesting disabling of the reproduction of the ambient sound signal, the control circuit 40 issues a disable control signal to the signal processing circuit 54 via bus 88.

The disable control signal is configured to control the state of the switch 84, i.e., whether open or closed. As previously stated, during normal operation the switch 84 is closed and the headset speaker 32 is provided with both the received audio signal and the ambient sound signal combined. When the disable control signal goes active as a result of the control circuit 40 detecting the occurrence of an event, however, the switch 84 is opened. Thus, the ambient sound signal is not input to the adder 86. In this manner, the signal processing circuit 54 disables the reproduction of the ambient sound signal while still permitting reproduction of the received audio signal.

Figure 4:
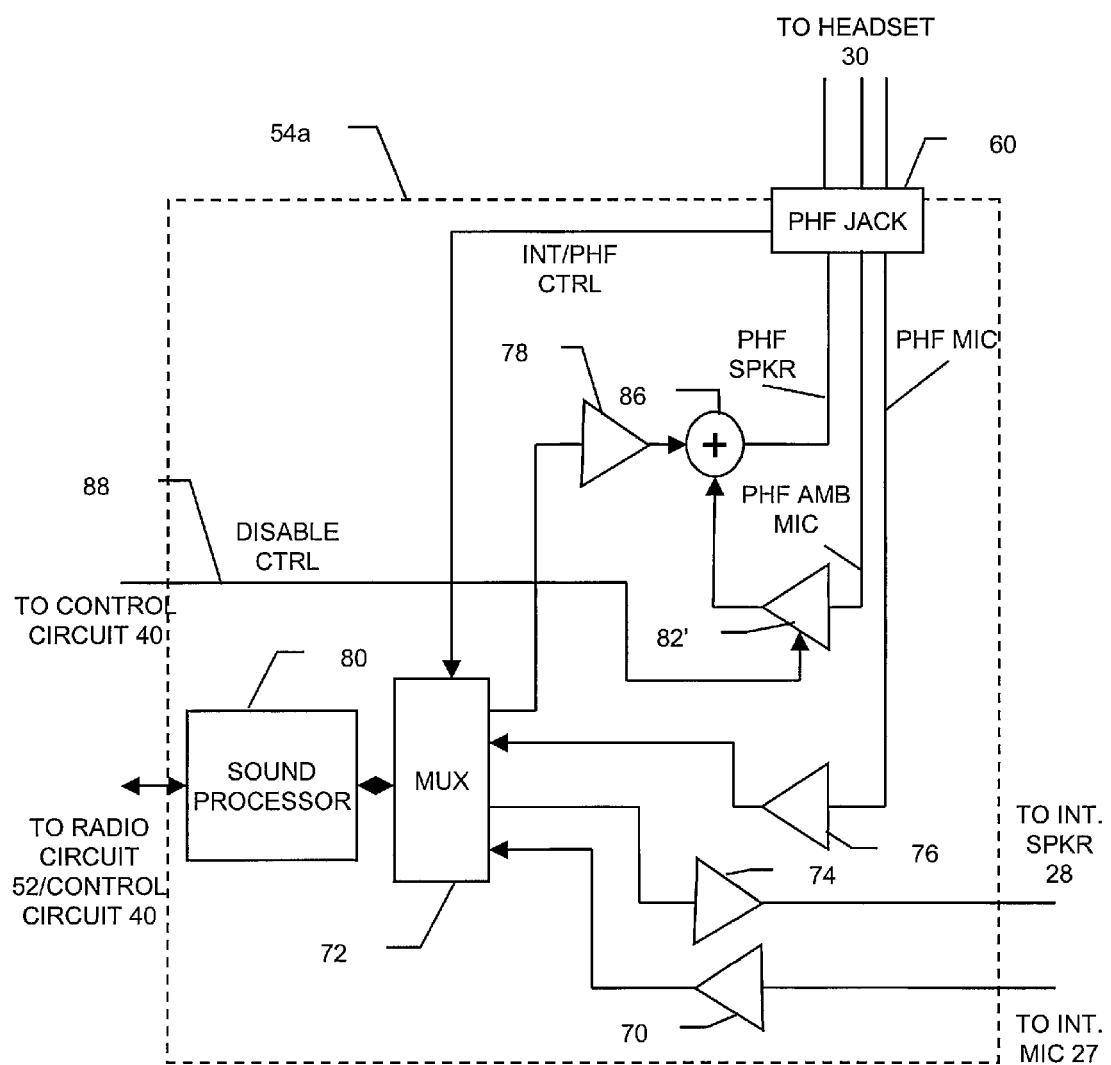
FIG. 4 is a schematic diagram of the sound signal processing circuit in the mobile phone in accordance with another embodiment of the present invention.

FIG. 4 illustrates another example of the signal processing circuit, designated 54a in this case, in accordance with the present invention. Since there are many similarities between the examples discussed herein, only the significant differences between the examples will be discussed for sake of brevity. Moreover, it will be appreciated that the various aspects discussed herein with respect to the different embodiments can be combined in a variety of manners without departing from the scope of the invention. Although the present application describes a number of particular embodiments, various features and aspects of the embodiments may be shared in a variety of other combinations not necessary shown.

In the embodiment of FIG. 4, the switch 84 is removed and the amplifier 82 for amplifying the ambient sound signal provided by the headset ambient sound microphone 38 is replaced by an adjustable gain amplifier 82'. The disable control signal provided by the control circuit 40 controls the amount of gain provided to the ambient sound signal prior to being input to the adder 86. Under normal operating conditions, the amplifier 82' is configured to provide sufficient gain to allow a user to hear both the received audio signal provided by the mobile phone 10 and the ambient sound signal provided by the microphone 38. On the other hand, if the control circuit 40 detects the occurrence of a predetermined event as discussed above (e.g., a telephone connection to the user's voicemail or another special number, a low amplitude received audio signal, user input, etc.), the disable control signal provided by the control circuit 40 causes the gain of the amplifier 82' to be reduced. As a result, the signal provided by the amplifier 82' to the adder 86 is substantially reduced in amplitude and/or becomes non-existent. The signal processing circuit 54a thereby substantially disables the reproduction of the ambient sound signal by the speaker 32 while still permitting the reproduction of the received audio signal.

Figure 5:
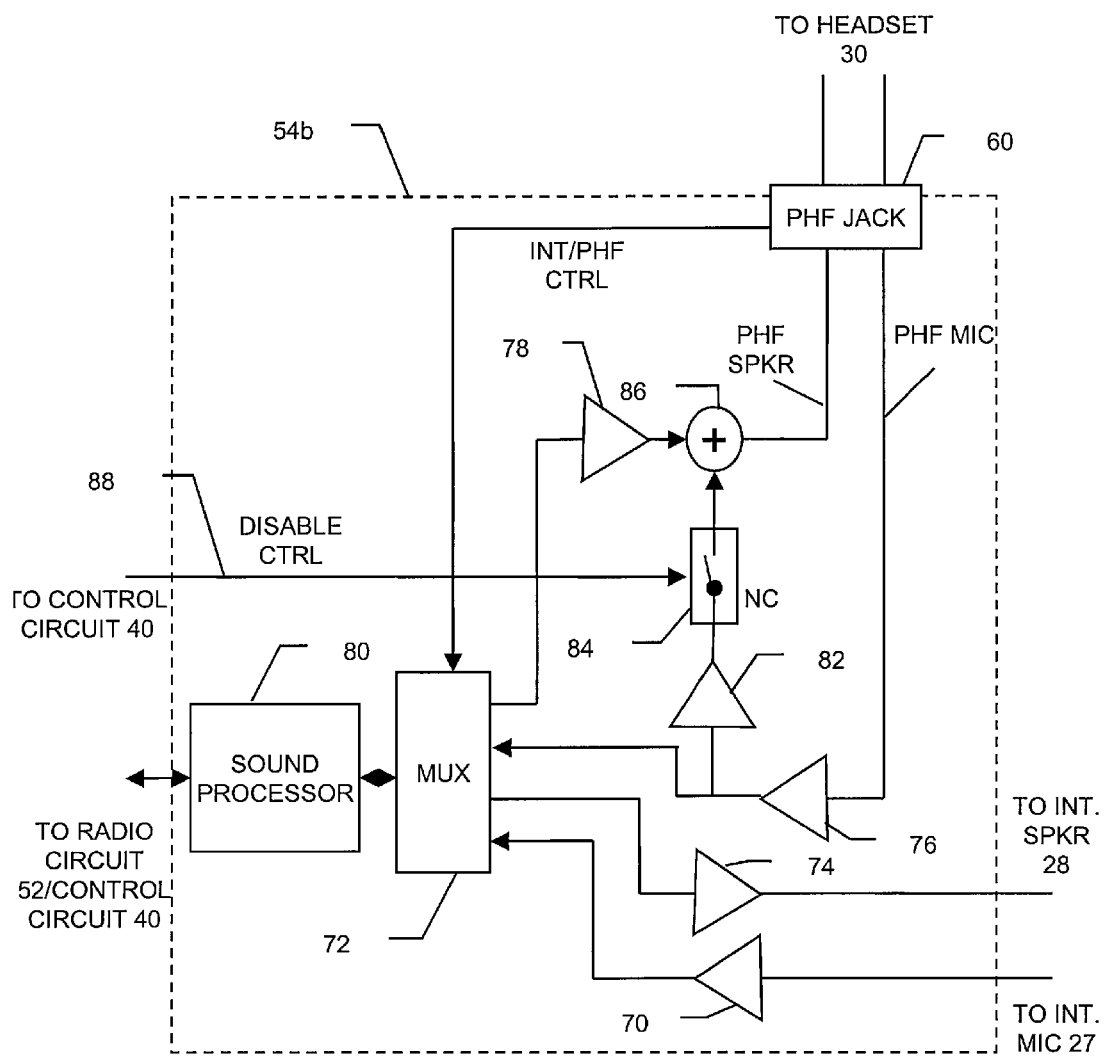
FIG. 5 is a schematic diagram of the sound signal processing circuit in the mobile phone in accordance with yet another embodiment of the present invention.

FIG. 5 illustrates another embodiment of the signal processing circuit of the mobile phone 10, in this case designated 54b. In this particular embodiment, the headset 30 does not include a dedicated ambient sound microphone 38. Rather, the microphone 34 is designed to pick up ambient sounds also such that the audio signal provided by the main microphone 34 also serves as the ambient sound signal. Consequently, the audio signal from the main microphone 34, in addition to being input to the multiplexer 72, is input to amplifier 82. Similar to the embodiment of FIG. 3, the amplifier 82 outputs the amplified signal to one terminal of the NC switch 84, with the other terminal of the switch being coupled to the input of the adder 86.

Thus, the ambient sound signal from the microphone 34 is combined with the received audio signal provided by the mobile phone 10 via the adder 86 during normal operation. As a result, the headset speaker 32 reproduces both the received audio signal and the ambient sound signal such that the user does not experience the inconvenience or discomfort associated with not having ambient sound mixed in with the received audio.

Again, however, if the control circuit 40 detects the occurrence of an event such as a call to or from one of the "special" numbers stored in memory 44, the received audio signal having an amplitude below a predetermined threshold, or a user input as discussed above, the control circuit 40 issues a disable control signal to the signal processing circuit 54b via bus 88. When the disable control signal goes active as a result of the control circuit 40 detecting the occurrence of such an event, the switch 84 is opened. In this manner, the signal processing circuit 54b disables the reproduction of the ambient sound signal while still permitting reproduction of the received audio signal.

Those having ordinary skill in the art will appreciate that the switch 84 in the embodiment of FIG. 5 could be replaced with an adjustable amplifier 82' analogous to the embodiment of FIG. 4, for example.

Figure 6:
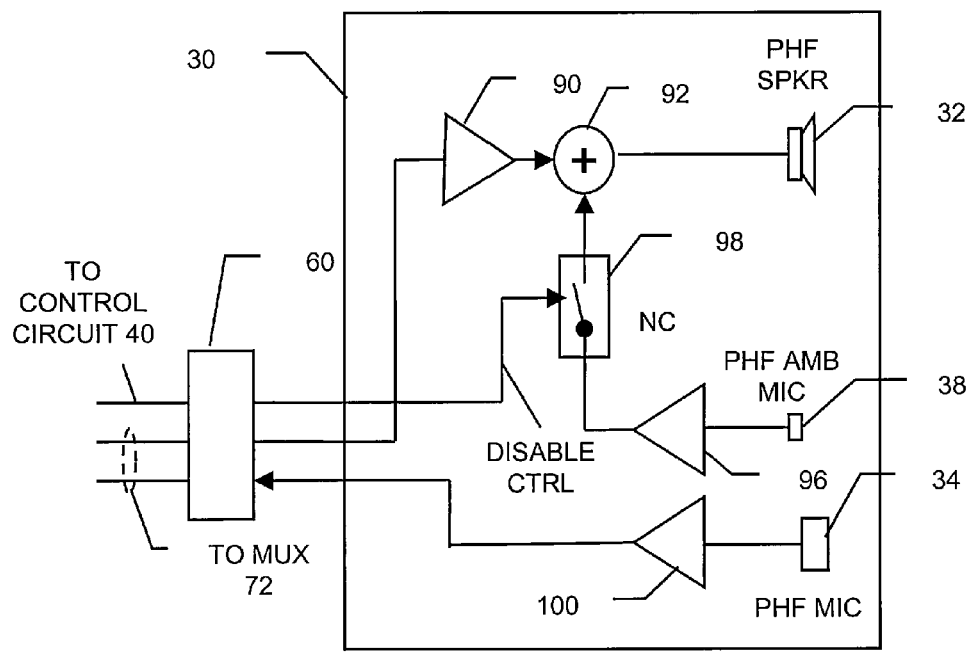
FIG. 6 is a schematic diagram of the sound signal processing circuit in a wired PHF earpiece in accordance with another embodiment of the present invention.
Figure 7:
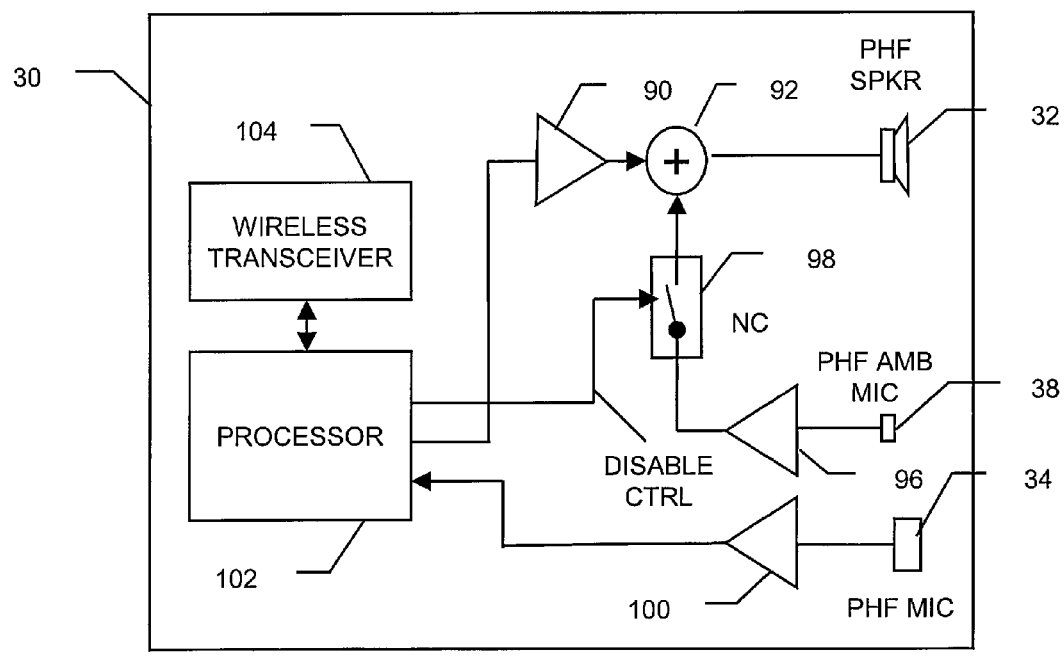
FIG. 7 is a schematic diagram of the sound signal processing circuit in a wireless PHF earpiece in accordance with another embodiment of the present invention.
Figure 8:
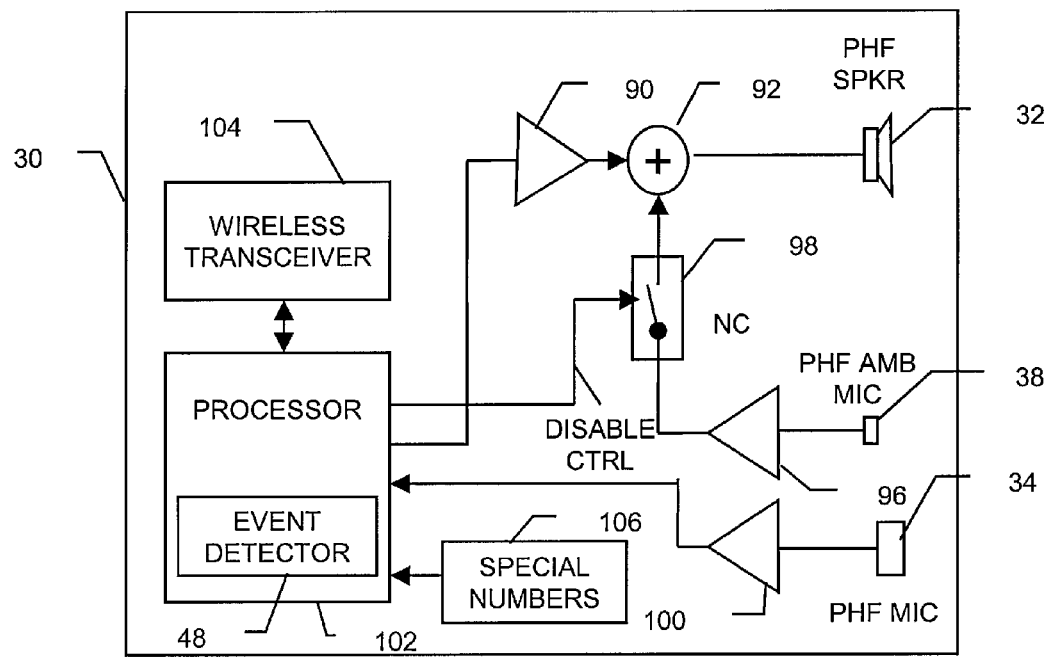
FIG. 8 is a schematic diagram of the sound signal processing circuit in a wireless PHF earpiece in accordance with another embodiment of the present invention.

FIGS. 6-8 represent embodiments of the present invention illustrating how one or more features described above as being part of the signal processing circuit 54 of the mobile device 10 may instead be incorporated in the headset 30 itself. For example, FIG. 6 illustrates how the headset 30 may include circuitry for disabling the reproduction of the ambient sound signal instead of the signal processing circuit 54. The audio signal received by the mobile phone 10 is provided to the headset 30 via the jack 60 and is input to an amplifier 90. The amplified audio signal is then input to an adder 92, and the output of the adder 92 is provided to the headset speaker 32.

In the embodiment of FIG. 6 where the headset 30 includes the dedicated ambient sound microphone 38, the ambient sound signal from the microphone 38 is input to an amplifier 96. Similar to the above embodiments, the output of the amplifier 96 is coupled to one terminal of NC switch 98. The other terminal of the switch 98 is coupled to the other input of the adder 92. The state of the switch 98 (i.e., whether open or closed) is controlled by the disable control signal provided to the headset 30 via the jack 60. Meanwhile, the microphone 34 of the headset 30 produces an audio signal that is input to amplifier 100. The output of the amplifier 100 is in turn provided to the mobile phone 10 via the jack 60.

Accordingly, during normal operation the switch 98 is closed and ambient sound picked up by the microphone 38 is combined with the received audio signal provided by the mobile phone 10. The headset speaker 32 in turn reproduces the combined signal such that the user does not experience the inconvenience or discomfort associated with not having ambient sound mixed in with the received audio. On the other hand, if the control circuit 40 within the mobile phone 10 detects the occurrence of a predefined event such as the user communicating with his or her voicemail as discussed above, the control circuit 40 automatically provides the disable control signal to the headset 30 so as to cause the switch 98 to open. As a result, the reproduction of the ambient sound signal from the microphone 38 is disabled while the reproduction of the audio signal received from the mobile phone 10 continues. As with all of the embodiments discussed herein, upon the control circuit 40 determining that an event has ended (e.g., the voicemail or other special number communication has terminated, the amplitude level of the audio signal has increased, a subsequent user input has been received, etc.), the reproduction of the ambient sound signal can be re-enabled automatically via the disable control signal.

Although not specifically shown, it will be appreciated that the embodiment of FIG. 6 could be modified similar to the embodiment of FIG. 5 such that the headset 30 does not include an ambient sound microphone 38. Rather, the audio signal from the main microphone 34 is provided at the input to the adder 92 in addition to being provided to the mobile phone 10 via the jack 60. Furthermore, the switch 98 can be replaced by an amplifier with adjustable gain similar to the embodiment of FIG. 4. Moreover, any other mechanism for selectively disabling the reproduction of the ambient sound signal while permitting reproduction of the audio signal provided by the mobile phone 10 may be utilized without departing from the scope of the invention as will be appreciated. The particular examples described herein are meant simply to be examples of the many ways of achieving the same result.

FIG. 7 represents a variation of the embodiment of FIG. 6 wherein the headset 30 is a wireless device, e.g., Bluetooth based. The headset 30 includes a processor 102 programmed to carry out conventional headset functions as well as the additional functions described herein. In addition, the headset 30 includes a wireless transceiver 104 designed to be able to communicate with the wireless transceiver 64 included in the mobile phone 10. The embodiment of FIG. 7 operates in the same manner as the embodiment of FIG. 6 with the exception that the audio signals and disable control signal are provided between the mobile phone 10 and the headset 30 via wireless communication between the transceivers 64 and 104 rather than by hard-wired connection.

Again, although not shown, the embodiment of FIG. 7 could be modified to utilize the microphone 34 in place of the ambient sound microphone 38 to produce the ambient sound signal. Moreover, an adjustable gain amplifier may be used in place of the switch 98.

FIG. 8 illustrates an embodiment of the headset 30 in which the headset itself detects the occurrence of a predefined event in place of the control circuit 40 in the mobile phone 10. For example, the processor 102 and the wireless transceiver 104 are programmed to transmit audio signals between the mobile phone 10 and the headset 30 as is conventional. However, the processor 102 also is programmed to carry out event detector functions 48 in the same manner as the control circuit 40 as described above in the previous embodiments.

More specifically, the headset 30 includes a memory 106 that stores "special" numbers similar to the memory 44 in the embodiment of FIG. 2. Using conventional techniques whereby headsets receive caller identification information from the mobile phone 10 in order to be displayed on the headset itself, the processor 102 is programmed to receive such information. Moreover, the processor 102 is programmed to compare such information with the special numbers stored in the memory 106 in order to determine whether a connection has been made with number stored in the memory 106. If so, the processor 102 thereby detects the occurrence of an event in accordance with the present invention. In addition, or in the alternative, the processor 102 may detect the occurrence of some other predefined event such as the received audio signal intended for reproduction by the speaker 32 being below a predefined amplitude, a user input to the headset 30, etc.

The numbers stored in the memory 106 may be entered in any manner, including those discussed above in relation to the numbers stored in the memory 44.

The processor 102, upon detecting the occurrence of such an event, is programmed to provide automatically a disable control signal to the NC switch 98 so as to disable the reproduction of the ambient sound signal while continuing to permit reproduction of the audio signal received from the mobile phone 10. Thus, operation consistent with the invention may be carried out solely within the headset 30 if desired. This is particularly useful as it does not require any modifications to conventional mobile phones as will be appreciated.

Again, although not shown, the embodiment of FIG. 8 could be modified to utilize the microphone 34 in place of the ambient sound microphone 38 to produce the ambient sound signal. Moreover, an adjustable gain amplifier may be used in place of the switch 98.

Figure 9:
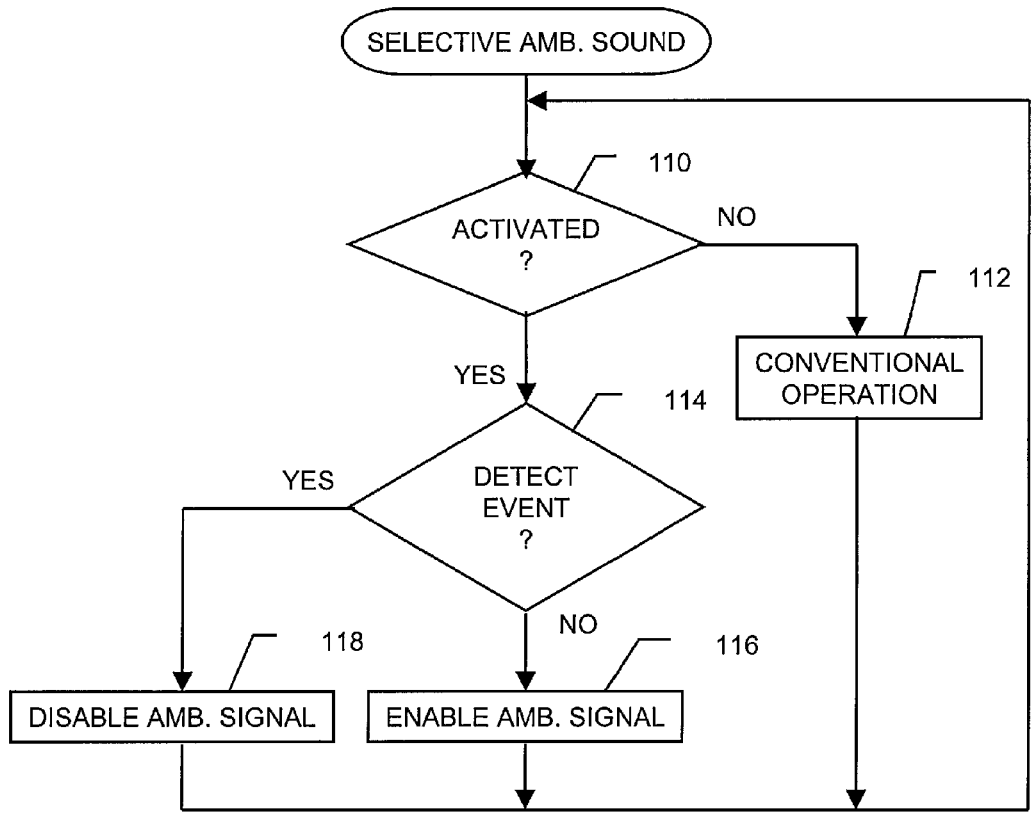
FIG. 9 is a simplified flowchart suitable for programming operation of a portable electronic device and PHF accessory in accordance with the present invention.

FIG. 9 is a flowchart that illustrates the basic operation of the present invention. It will be appreciated that such operation may be carried out exclusively in the mobile phone 10, in the headset 30, or via some combination thereof. Beginning in step 110, the control circuit 40 and/or the processor 102 determines if the above-described feature of selective ambient sound has been activated. This may be via menu selection carried out by the user to activate such feature as will be appreciated, or via the feature being enabled automatically by the mobile phone 10 or the headset 30 by default, for example. If the feature is not activated, the mobile phone 10 and headset 30 operate in a conventional manner as represented by step 112. The process then returns to step 110 and the procedure is repeated.

On the other hand, if the feature is activated as determined in step 112, the control circuit 40 and/or the processor 102 determines in step 114 whether the occurrence of an event has been detected as described above. If not, the procedure continues to step 116 in which reproduction of the ambient signal is enabled (e.g., via the disable control signal). As a result, the user may hear both the audio signal provided by the mobile phone 10 as well as the ambient sound signal. The process then returns to step 110 as shown and the procedure is repeated.

If an event is detected in step 114, the reproduction of the ambient signal is disabled in step 118 as described above (e.g., via the disable control signal). Again, this may be carried out via the control circuit 40 and disabling circuitry in the mobile phone 10, by the processor 102 and disabling circuitry in the headset 30 itself, or any combination thereof. The process then returns to step 110 as shown and the procedure is repeated.

For the above reasons, the portable electronic device (e.g., mobile phone 10) and PHF accessory (e.g., headset 30) overcome the aforementioned shortcomings associated with conventional portable electronic devices and PHF accessories. Namely, the portable electronic device and PHF accessory avoid the difficulties associated with reproduced ambient sound masking the desired audio signal during the occurrence of predefined events (e.g., calls to/from a user's voicemail).

The term "portable electronic device" as referred to herein includes portable radio communication equipment. The term "portable radio communication equipment" includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A personal hands-free accessory for use with a portable electronic device, comprising:
   an input that receives an audio signal from the portable electronic device;
   at least one electro-acoustic speaker for converting electrical signals to audible sound;
   at least one microphone that receives ambient sound and converts the ambient sound to an ambient sound signal;
   a processing circuit, the processing circuit including circuitry that combines the audio signal from the portable electronic device with the ambient sound signal from the at least one microphone and provides the combined signals to the at least one speaker such that the at least one speaker reproduces the ambient sound in combination with audio from the audio signal;
   event detecting circuitry for detecting an occurrence of a predefined event; and
   disabling circuitry for substantially disabling the reproduction of the ambient sound signal by the at least one speaker based upon the detected occurrence of the predefined event, while still permitting the reproduction of the audio signal by the at least one speaker;
   wherein the portable electronic device comprises a mobile phone, and the predefined event comprises the mobile phone engaging in a phone communication with a predefined connection.

2. The personal hands-free accessory according to claim 1, wherein the predefined connection comprises a voicemail connection.

3. The personal hands-free accessory according to claim 1, wherein the disabling circuitry comprises a switch for switching the ambient sound signal.

4. The personal hands-free accessory according to claim 1, wherein the disabling circuitry comprises an adjustable gain amplifier that adjusts the gain of the ambient sound signal.

5. A portable electronic device for use with a personal hands-free accessory, the personal hands free accessory including an input that receives a combined audio signal from the portable electronic device, at least one electro-acoustic speaker for converting the combined audio signal to audible sound, and at least one microphone that receives ambient sound and converts the ambient sound to an ambient sound signal that is output to the portable electronic device, the portable electronic device comprising:
   a processing circuit, the processing circuit including circuitry that combines an audio signal from the portable electronic device with the ambient sound signal from the at least one microphone to produce the combined audio signal provided to the at least one speaker such that the at least one speaker reproduces the ambient sound in combination with audio from the audio signal;
   event detecting circuitry for detecting an occurrence of a predefined event; and
   disabling circuitry for substantially disabling the reproduction of the ambient sound signal by the at least one speaker based upon the detected occurrence of the predefined event, while still permitting the reproduction of the audio signal by the at least one speaker;
   wherein the portable electronic device comprises a mobile phone, and the predefined event comprises the mobile phone engaging in a phone communication with a predefined connection.

6. The portable electronic device according to claim 5, wherein the predefined connection comprises a voicemail connection.

7. The portable electronic device according to claim 5, wherein the disabling circuitry comprises a switch for switching the ambient sound signal.

8. The portable electronic device according to claim 5, wherein the disabling circuitry comprises an adjustable gain amplifier that adjusts the gain of the ambient sound signal.

9. A portable electronic device and personal hands-free accessory, wherein:

the personal hands free accessory includes:
  at least one electro-acoustic speaker; and
  at least one microphone that receives ambient sound and converts the ambient sound to an ambient sound signal; and
  included among the portable electronic device and the personal hands-free accessory are:
    a processing circuit, the processing circuit including circuitry that combines an audio signal from the portable electronic device with the ambient sound signal from the at least one microphone to produce a combined audio signal provided to the at least one speaker such that the at least one speaker reproduces the ambient sound in combination with audio from the audio signal;
    event detecting circuitry for detecting an occurrence of a predefined event; and
    disabling circuitry for substantially disabling the reproduction of the ambient sound signal by the at least one speaker based upon the detected occurrence of the predefined event, while still permitting the reproduction of the audio signal by the at least one speaker;
  wherein the portable electronic device comprises a mobile phone, and the predefined event comprises the mobile phone engaging in a phone communication with a predefined connection.

10. The portable electronic device and personal hands-free accessory according to claim 9, wherein the electronic device comprises the processing circuitry, the event detecting circuitry, and the disabling circuitry.

11. The portable electronic device and personal hands-free accessory according to claim 9, wherein the electronic device comprises the processing circuitry and the event detecting circuitry, and the personal hands-free accessory comprises the disabling circuitry.

12. The portable electronic device and personal hands-free accessory according to claim 9, wherein the electronic device comprises the processing circuitry, and the personal hands-free accessory comprises the event detecting circuitry and the disabling circuitry.

13. The portable electronic device and personal hands-free accessory according to claim 9, wherein the personal hands-free accessory comprises the processing circuitry, the event detecting circuitry, and the disabling circuitry.

14. The portable electronic device and personal hands-free accessory according to claim 9, wherein the predefined connection comprises a voicemail connection.

15. The portable electronic device and personal hands-free accessory according to claim 9, wherein the disabling circuitry comprises a switch for switching the ambient sound signal.

16. The portable electronic device and personal hands-free accessory according to claim 9, wherein the disabling circuitry comprises an adjustable gain amplifier that adjusts the gain of the ambient sound signal.

* * * * *